June 9, 1959 — G. A. LYON, JR — 2,889,559
SINK CONSTRUCTION
Filed Jan. 23, 1957 — 2 Sheets-Sheet 1

Inventor
GEORGE A. LYON, JR.

June 9, 1959   G. A. LYON, JR   2,889,559
SINK CONSTRUCTION
Filed Jan. 23, 1957   2 Sheets-Sheet 2
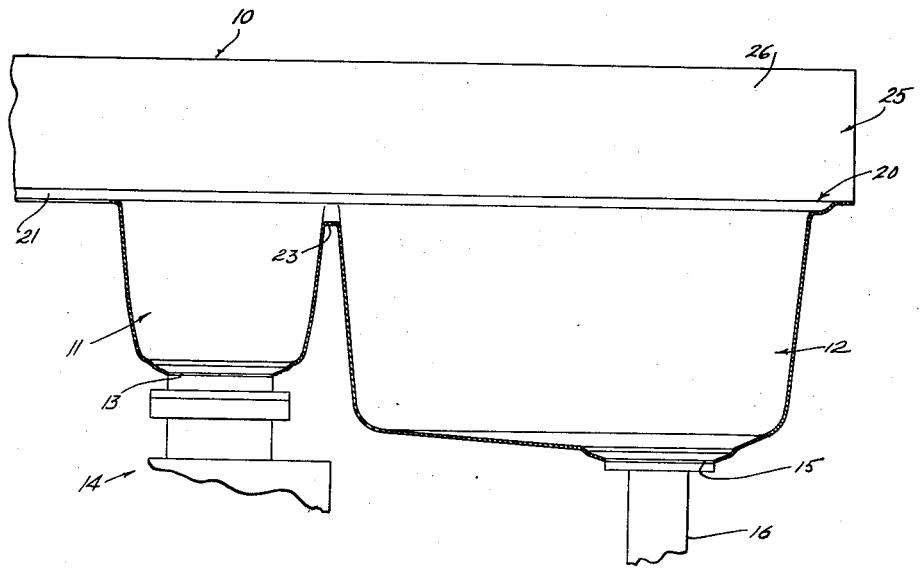
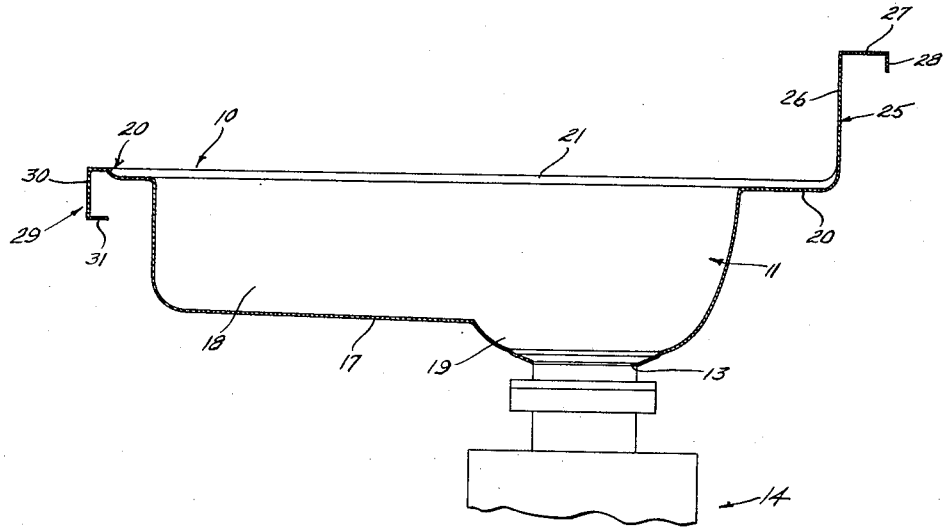
Inventor
GEORGE A. LYON, JR.
by Hill, Sherman, Meroni, Gross & Simpson
Attys.

United States Patent Office 2,889,559
Patented June 9, 1959

2,889,559
SINK CONSTRUCTION
George A. Lyon, Jr., Detroit, Mich.
Application January 23, 1957, Serial No. 635,840
2 Claims. (Cl. 4—187)

This invention relates generally to a sink construction. More particularly, this invention relates to a sink comprised of a sheet metal stamping having spaced laterally adjacent cup-shaped bowls separated from one another by a partition. Surrounding the bowls is a dished counter portion which is extended at one end and which are counter portions inclined toward the bowls and is thereby adapted to drain any splashed water and the like back into the sink bowls. The present sink construction is believed to be particularly advantageous in view of the provision of a cup-shaped bowl portion comprising a garbage sump and silver ware collection center. The bottom of the sump is smoothly curved in a step like manner and an outlet is provided at the lowermost point of the bottom so that garbage may collect at this point and be discharged into a garbage disposal unit disposed below the outlet.

Accordingly, an object of this invention is to provide a new and improved sink construction.

Another object of this invention is to provide a sink construction which lends itself to economical manufacture on a large production basis since the sink may be readily formed from a sheet metal stamping.

A further object of this invention relates to the provision of laterally adjacent particularly constructed smaller bowls adapted to facilitate the housewife in more efficiently handling certain types of jobs.

According to the general features of this invention there is provided a sink comprising a sheet metal stainless steel stamping which has spaced laterally adjacent cup-shaped bowl portions, one of the bowl portions being substantially reduced in width and depth compared to the other bowl portion and comprising a garbage sump having an outlet through which the garbage is dropped into a garbage disposal unit. The other of the cup-shaped bowl portions is substantially wider and deeper than the reduced bowl portion and has a fluid outlet.

The reduced cup-shaped bowl portion has an inclined step-like smoothly curved bottom compartmentalizing the reduced cup-shaped bowl portion and with the garbage outlet disposed at the lowermost point of the inclined bottom for draining into a garbage disposal unit. The sink stamping has a counter surrounding the bowl portions including an extended counter portion laterally to one side of the bowl portion for overlying and resting upon a dishwasher unit. A partition flange is provided and lies substantially below the level of the dished counter and extended counter portion and joins the spaced laterally adjacent cup-shaped bowl portions together. The counter and counter portion are dished and inclined downwardly toward the bowl portions permitting fluids to drain from the counter portion and be discharged into the bowl portions. The sink stamping has an L-shaped combination hanger bracket and splash deflector to the rear and extending above the bowl portions, the counter, and the extended counter portion for supporting the sink in a predetermined position and turning splash back into the bowl portions. A turned sink channel support is provided forward of the bowl portions, the counter and the extended counter portion for further supporting the sink. The combination bracket and splash deflector and the channel support extends continuously along the length of the sink stamping.

Other objects and features of this invention will more fully become apparent in view of the following detailed description taken in conjunction with the accompanying drawing illustrating a single embodiment and in which:

Figure 3 is an enlarged cross sectional view taken substantially on the line III—III of Figure 1 looking in the direction indicated by the arrows; and Figure 4 is an enlarged cross sectional view taken substantially on the line IV—IV looking in the direction indicated by the arrows.

As shown on the drawings:

Figure 1:
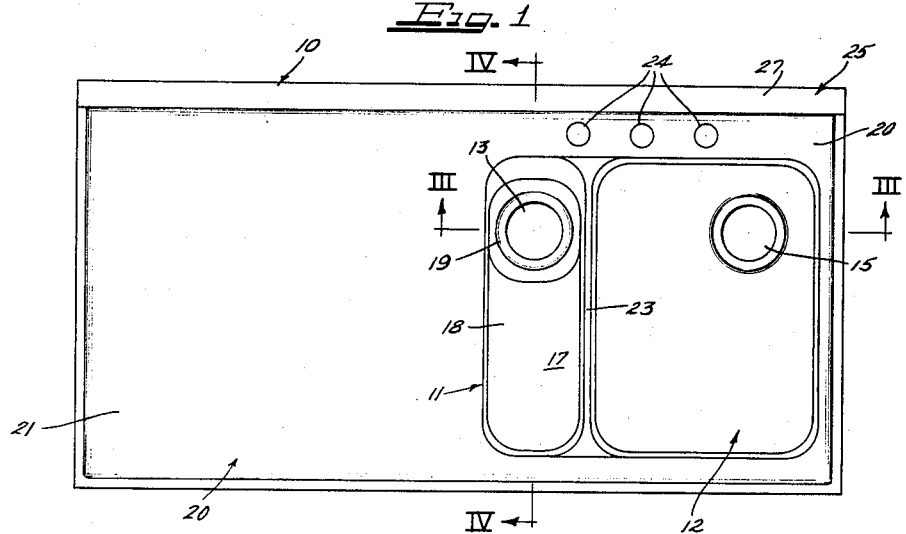
Figure 1 is a plan view of my sink stamping.

The reference numeral 10 indicates generally my sink construction which is preferably comprised of a sheet metal stamping. By making the sink from a single stamping production cost may be reduced due to the absence of weld joints and the like and further since a sink of this type lends itself to being manufactured on a large production basis. Preferably, the material used in the formation of the sink is stainless steel. This type of material has been found to be highly satisfactory as stainless steel is very durable. Stainless steel is also highly attractive in appearance and may be readily maintained in an attractive condition by a housewife over a long period of time.

The sink 10 includes spaced laterally adjacent cup-shaped bowl portions 11 and 12 with the bowl portion 11 being greatly reduced in size as compared to the other bowl portion 12 and comprising a garbage sump having an outlet 13 through which garbage may be dropped into garbage disposal unit 14 which is diagrammatically shown in the drawings. The bowl portions 11 and 12 each have a pair of longitudinal and transverse (front to rear) side wall areas with the longitudinal and transverse side wall areas on the bowl portion 11 being parallelly disposed with respect to the longitudinal and transverse side wall areas on the bowl portion 12. In addition, the bowl portion 11 has its longitudinal side wall areas reduced in longitudinal length with respect to the bowl portion 12. The cup-shaped bowl portion 12 has its longitudinal side wall areas elongated in length with respect to the bowl portion 11 as is evident from Figure 1.

The other of the bowl portions 12 is substantially wider and deeper than the bowl portion 11 and has a fluid outlet 15 which discharges into diagrammatically illustrated drain pipes 16.

The reduced bowl 13 has a smoothly curved and inclined bottom 17 compartmentalizing the bowl portion 11 into an upper compartment or shelf area 18 for silverware and a lower compartment or sump 19 for garbage (Fig. 4). The bottom 17 is inclined toward the garbage outlet 13 which is disposed at the lowermost point of the compartment 19 for draining into the garbage disposal unit 14.

Figure 2:
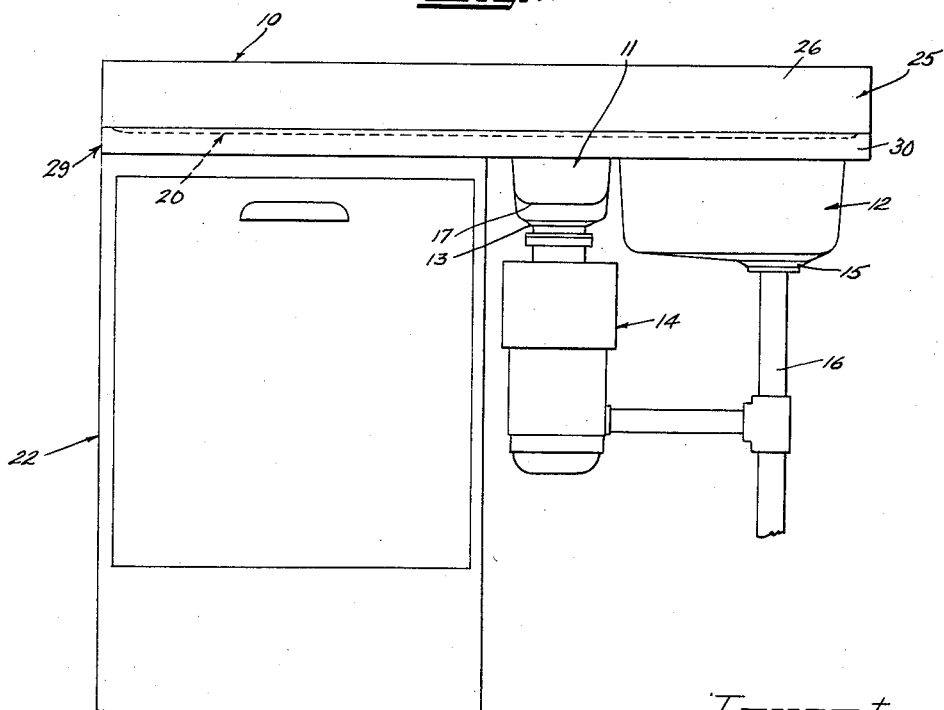
Figure 2 is an end view of my sink stamping and with related devices diagrammatically shown and illustrating their relationship with respect to the sink stamping.

The sink stamping 10 has a dished counter 20 surrounding the bowl portions 11 and 12 including an extended dished counter portion 21 laterally to one side of the bowl portions for overlying and resting upon a dishwasher unit 22, diagrammatically illustrated in Figure 2. The dished counter and counter portion are inclined downwardly toward the bowl portions 11 and 12 permitting fluids to drain therefrom and be discharged into the bowls.

A partition flange or rib 23 lies substantially below the level of the dished counter and extended counter portion and joins the spaced laterally adjacent cup-shaped bowls 11 and 12 together. It will be appreciated, the partition flange is an extension from the side walls of the bowls 11 and 12. The reason why the partition flange is positioned below the level of the counter and counter portion is that should one of the bowls overflow the overflowing fluid may flow into the other of the bowls.

To the rear of the bowls 11 and 12 are provided openings 24 through which pipes may extend and to which fixtures may be attached for regulating and directing water into the bowl area. One of the openings 24 may be for an extension hose having a spare nozzle on its free end.

The sink stamping has an L-shaped combination bracket and splash deflector 25 to the rear of and extending above the bowls 11 and 12 as is shown in Figure 4. The bracket 25 is turned upwardly from the counter 20 and includes successive flanges 26, 27, and 28. The flange 26 is extended to provide a deflector plate. The flange 27 extends rearwardly at right angles to the flange 26 and the flange 28 extends downwardly at right angles to the flange 27. These flanges cooperate together to hook over a bar (not shown) which may be fastened to the wall of the building or the like. By this means the sink may be suspended from the wall of the building.

A turned sink channel support 29 is positioned forward of the bowls 11 and 12. This support is turned underneath the counter 20 (Figure 4) and includes flanges 30 and 31 which are at right angles to one another. A bar (not shown) may be lodged between the counter 20, the flange 30 and the flange 31 to support the forward edge of the sink 10. The dishwasher unit 22 is disposed underneath the sink 10 and the extended dish counter 21 may rest upon the top of the unit if desired. However, it is preferable that the channel support 29 be utilized to maintain the forward edge of the sink in proper position by means of having a bar or the like lodged in the channel support to carry the weight of the sink.

It will be noted, that both the combination hanger bracket and splashed deflector 25 and the sink channel support 29 extend continuously the full length of the sink 10.

The above described sink 10 is believed to be of a particularly modern design and of a type which is believed to have great utility since the housewife may more readily and efficiently carry out her kitchen duties through the use of a sink of this type. In the first place, by providing a garbage sump which leads directly to the garbage disposal unit refuse may be collected in the sink and the housewife need not immediately urge the garbage into the disposal unit since she has available another sink bowl to facilitate the accomplishment of other chores which she may be carrying on at the same time. This sink is also believed to be particularly advantageous in connection with the washing of dishes since the smaller bowl 11 provides a collection point for silver ware, the pieces of which may lie in substantially parallel relationship to one another while and after they have been washed off in a preliminary manner prior to being placed into the dishwasher unit 22. The stepped bottom 17 of the smaller bowl 11 facilitates the cleansing of the bowl since garbage will have a tendency to more readily collect at the outlet 13.

It will be appreciated that my sink 10 has many other advantages which in combination with the aforementioned advantages provide a sink which may be efficiently operated by a housewife and which has a lasting attractive appearance.

It will be understood that modifications and variations may be effected without departing from the scope of the novel concepts of the present invention.

I claim as my invention:

1. A sink comprising a sheet metal stainless steel stamping and having spaced laterally adjacent cup-shaped bowl portions disposed at one of the longitudinal ends of the stamping, one of said cup-shaped bowl portions being substantially reduced in width and depth as compared to the other cup-shaped bowl portion and having a garbage sump having an outlet through which the garbage is dropped into a garbage disposal unit, the other of said cup-shaped bowl portions being substantially wider and deeper than the reduced cup-shaped bowl portion and having a fluid outlet, said bowl portions each having a pair of longitudinal and transverse side wall areas with the longitudinal and transverse side wall areas on one of said bowl portions being parallelly disposed with respect to the longitudinal and transverse side wall areas on another and the other of said bowl portions, one of said bowl portions having its longitudinal side wall areas reduced in longitudinal length with respect to the other bowl portion, the other of said cup-shaped bowl portions having its longitudinal side wall areas elongated in length with respect to the adjacent bowl portion, said reduced cup-shaped bowl portion having an inclined silverware shelf area with a lowermost end of the inclined silverware shelf area overlying the sump area and compartmentalizing the reduced cup-shaped bowl portion and with the garbage outlet disposed at the lowermost point of the sump area for draining into a garbage disposal unit, the transverse side wall areas on both of the cup-shaped bowl portions being coextensive in length and with the longitudinal side wall areas on the cup-shaped bowl portions lying in common transversely spaced longitudinally extending planes, said sink stamping having a dished counter surrounding said cup-shaped bowl portions including an extended counter portion disposed at another of the longitudinal ends of the stamping laterally to one side of said bowl portions for overlying and resting upon a dish washer unit, a partition flange lying substantially below the level of the dished counter and extended counter portion and joining the spaced laterally adjacent cup-shaped bowl portions together, said counter and counter portion being dished and inclined downwardly toward said bowl portions permitting fluids to drain from the counter portion and be discharged into the cup-shaped bowl portions, said sink stamping having an L-shaped combination hanger bracket and splash deflector to the rear of and extending above said cup-shaped bowl portions, said counter and said extended counter portion for supporting the sink in a predetermined position and turning splash back into the bowl portions, and a turned sink channel support forward of the said cup-shaped bowl portions, said counter and said extended counter portion for further supporting the sink, said L-shaped combination hanger bracket and splash deflector and said channel support extending continuously along the length of said sink stamping.

2. A sink comprising a sheet metal stamping having laterally adjacent cup-shaped bowl portions separated from one another by a partition rib, said bowl portions each having a pair of longitudinal and transverse side wall areas with the longitudinal and transverse side wall areas on one of said bowl portions being parallelly disposed with respect to the longitudinal and transverse side wall areas on another and the other of said bowl portions, one of said bowl portions having its longitudinal side wall areas reduced in longitudinal length with respect to the other bowl portion and being provided with a stepped bottom including an inclined elevated silverwave supporting shelf area and a garbage sump area disposed below the lower end of the inclined shelf area and with said garbage sump area provided with a garbage discharge outlet, the other of said cup-shaped bowl portions having its longitudinal side wall areas elongated in length with respect to the adjacent bowl portion and being provided with a fluid outlet, the transverse side wall areas on both of the cup-shaped bowl portions being coextensive in length and with the longitudinal side wall areas on the cup-shaped bowl portions lying in common transversely spaced longitudinally extending planes.

References Cited in the file of this patent

UNITED STATES PATENTS

| | | |
|---|---|---|
| 2,305,866 | Graf | Dec. 22, 1942 |
| 2,391,034 | O'Brien | Dec. 18, 1945 |
| 2,498,502 | O'Brien | Feb. 21, 1950 |
| 2,524,204 | O'Brien | Oct. 3, 1950 |
| 2,753,571 | Draper | July 10, 1956 |

FOREIGN PATENTS

| | | |
|---|---|---|
| 774,227 | France | Sept. 17, 1934 |